Feb. 6, 1962  F. WEBSTER  3,019,922
LOADING DEVICES FOR MOUNTING ON VEHICLES
Filed Sept. 10, 1957
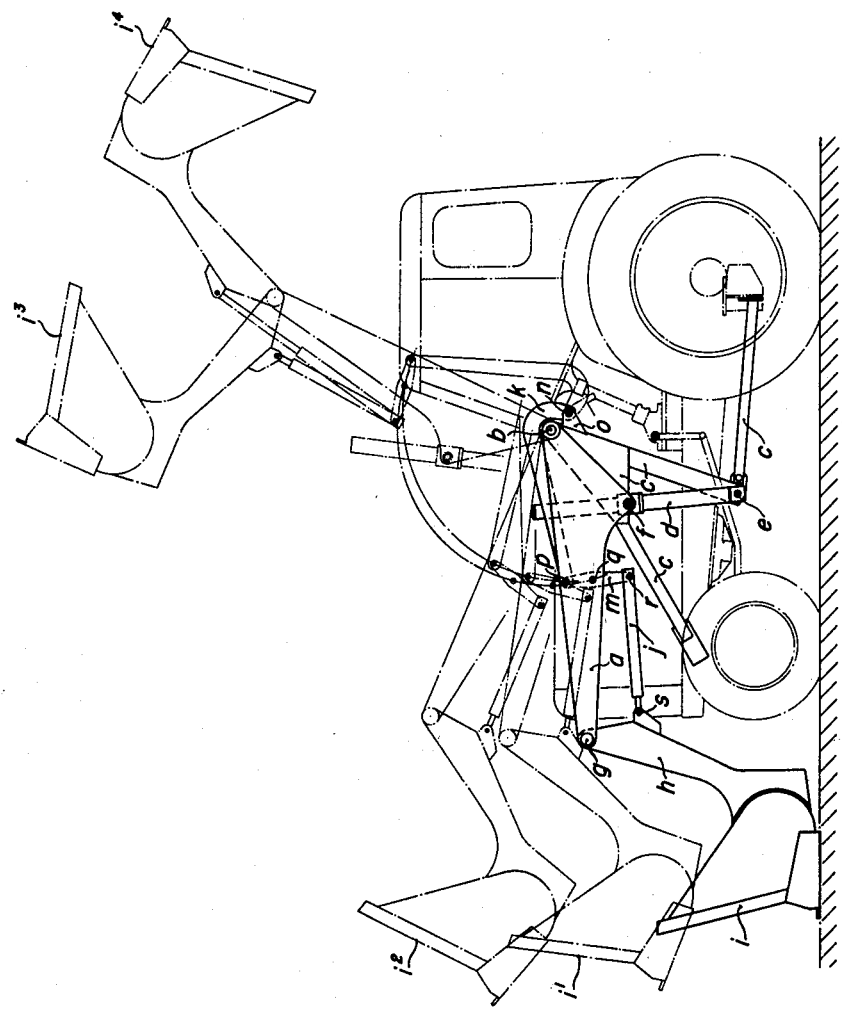
Inventor
FREDERICK WEBSTER
By Norris & Bateman
Attorneys

United States Patent Office 3,019,922
Patented Feb. 6, 1962

3,019,922
LOADING DEVICES FOR MOUNTING ON VEHICLES
Frederick Webster, Meltham, Huddersfield, England, assignor, by mesne assignments, to David Brown Tractors Limited, Meltham, Huddersfield, England, a company of Great Britain
Filed Sept. 10, 1957, Ser. No. 683,159
Claims priority, application Great Britain Sept. 15, 1956
6 Claims. (Cl. 214—140)

The invention relates to power operated loading devices for mounting on tractors or like vehicles, by means of which loose bulky materials such as soil, rock, sand or gravel may readily be moved from place to place, or loaded into a cargo-carrying body on a separate motor vehicle, or in some cases, on the vehicle itself, or on a trailer hitched thereto. Such arrangements may also be used for light excavating.

Loading devices in general may be divided into two types, namely front end loaders which both dig and dump their load at the front end of the vehicle on which they are mounted, and which cannot therefore load the said vehicle itself or a trailer hitched thereto; and overloaders which dig at the front and dump at the rear of the vehicle on which they are mounted, and can thus very quickly load a cargo-carrying body provided in any of the positions referred to in the preceding paragraph.

In either type of loading device, two laterally spaced lifting arms are usually provided, each pivoted at one end on the vehicle frame and pivotally connected at the other to a bucket disposed between them, main control means, usually comprising a pair of hydraulic jacks, being provided for moving the said arms relative to the vehicle frame and secondary control means being provided for moving the bucket relative to the lifting arms.

The object of the invention is to provide a loading device of either of the said types having means whereby an efficient and automatic digging or scooping action of the bucket is obtainable by the power operation only of the main control means for the lifting arms. Normally this action is only obtainable when power operated secondary control means such as one or more hydraulic jacks are employed and the main and secondary control means are operated together. The present invention thus aims to simplify the digging operation for the vehicle driver.

According to the invention a loading device for mounting on vehicles comprises a support; at least one lifting-arm pivotally connected to said support; a bucket pivotally connected to the free end of said lifting-arm; power-operated means for pivotally raising said lifting-arm relative to said support; and linkage pivotally connected to said support, to said lifting arm and to said bucket for automatically swinging said bucket forwardly relative to said lifting-arm during the initial raising of said lifting-arm.

The accompanying drawing, which is by way of example only, shows in side elevation one preferred embodiment of the invention, as applied to an overloader, a tractor mounting same being shown in broken lines.

Referring now to the drawing, a pair of lifting arms $a$, $a$ are freely pivoted at their rearward ends about an upper transverse cross-shaft $b$ carried by a support $c$, adapted to be mounted upon a tractor. The said lifting arms are arranged one on each side of the said tractor and are angularly movable about the cross-shaft $b$ by what we term main control means comprising a pair of hydraulic jacks $d$, $d$ the rams of which are pivotally connected to the respective ends of a lower transverse cross-shaft $e$ carried by the support $c$ whilst the cylinders are pivotally connected, at points such as $f$, to the respective lifting arms $a$, $a$.

The forward ends of the lifting arms $a$, $a$ are connected together by a shaft $g$ on which are freely pivoted a pair of arms $h$, $h$ carrying fixedly between them a bucket $i$. For the purpose of the invention the arms $h$, $h$ may be regarded as upstanding portions of the bucket $i$. The angular position of the arms $h$, $h$ relative to the lifting arms $a$, $a$, is governed by a laterally spaced pair of linkage arrangements which each comprises a hydraulic jack $j$, a link $k$ and a lever $m$. Each link $k$ is freely pivoted at one end about a pin, such as $n$, in the appropriate one of a pair of brackets $o$, $o$ carried by the support $c$, and pivotally connected at its other end by a pin $p$ to one end of its associated lever $m$ which is itself pivotally connected to the appropriate lifting arm $a$ by a pin $q$. The other end of each lever $m$ is connected by a pin $r$ to the cylinder of the associated jack $j$, the ram of which is connected by a pin $s$ to the appropriate arm $h$. The distance $n$—$p$ is made somewhat greater than the distance $b$—$q$, and the pin $n$ is located a short distance below and to the rear of the cross-shaft $b$.

The source of pressure fluid, a tractor-engine-driven pump, for supplying the main and secondary control means is not shown, neither are the valve means or the conduit means for hydraulically connecting the said source to the control means, since these are of conventional construction.

This arrangement ensures that when the bucket $i$ has been filled by driving it into a pile of material, operation of the main control means $d$, $d$ alone is effective to lift the said bucket with an initial combined forwards and upwards movement and thus give to it a scooping action as seen by the successive bucket positions $i^1$ and $i^2$ in the accompanying drawing. This is due to the links $k$, $k$ rocking the levers $m$, $m$ relative to the lifting arms $a$, $a$ as the latter are raised, causing the jacks $j$, $j$, acting as simple links, to swing the arms $h$, $h$ forwardly about the the shaft $g$.

Furthermore, after causing the arms $h$, $h$ to be automatically swung forwardly relative to the lifting arms $a$, $a$ during the first part of the lifting movement the linkage then operates automatically in the reverse manner to draw the arms $h$, $h$ back towards the lifting arms as the latter approach and pass through a vertical position, thereby tending to keep the loaded bucket $i$ level and avoid spilling of the load.

The loaded bucket $i$ is brought to rest at the end of the stroke of the main rams by suitable buffer spring means, not shown, the connection between the main control means and the lifting arms $a$, $a$ being such that the said arms are free to make a small angular movement beyond that imparted to them by the actual extension of the said main control means, said movement permitting the energy stored in the parts being raised to be absorbed by the spring means referred to instead of causing jolting of the tractor and lifting of its front end. The loaded bucket $i$ is finally brought to rest in the elevated position $i^3$, in which position its weight is suitably distributed on the tractor wheels.

From the latter position the bucket $i$ is adapted to be swung rearwardly about the shaft $g$, upon the controlled actuation of the jacks $j$, $j$, to a position $i^4$, discharging its load at the rear of the tractor. The buffer spring means above referred to will of course also be effective to absorb shock as the bucket reaches the fully discharged position.

When the load has been discharged, appropriate operation of the jacks $j$, $j$ and $d$, $d$ causes the bucket $i$ to be returned to its lowered position in readiness for a further loading operation.

What I claim is:
1. A loading device for mounting on vehicles compris- ing a support; at least one lifting arm pivotally connected to said support; a bucket pivotally connected directly to the free end of and depending from said lifting arm; power operated means for pivotally raising said lifting arm relative to said support; and linkage pivotally connected to said support, to said lifting arm and to said bucket below the pivot connection of the bucket to the lifting arm and actuated by said raising movement of said lifting arm for automatically swinging said bucket forwardly relative to said lifting arm during the initial raising of said lifting arm.

2. A loading device for mounting on vehicles comprising a support; a pair of laterally spaced lifting arms pivotally connected to said support; a bucket pivotally connected directly to and depending from the free ends of said lifting arms; power operated means for pivotally raising said lifting arms relative to said support; and linkage pivotally connected to said support, to said lifting arms and to said bucket below the pivot connection of the bucket to the lifting arm and actuated by said raising movement of said lifting arms for automatically swinging said bucket forwardly relative to said lifting arms during the initial raising of said lifting arms.

3. A loading device for mounting on vehicles comprising a support; a pair of laterally spaced lifting arms pivotally connected to said support; a bucket pivotally connected directly to and depending from the free ends of said lifting arms; power operated means for pivotally raising said lifting arms relative to said support; and linkage, for automatically swinging said bucket forwardly relative to said lifting arms during the initial raising of said lifting arms, comprising a first pair of laterally spaced links pivoted at their rearward ends about a fixed axis on said support adjacent the axis about which said lifting arms are pivoted, a pair of levers each of which is pivoted intermediate its ends upon one of said lifting arms, means pivotally connecting the forward ends of said links to the respective upper ends of said levers, a second pair of laterally spaced links, the forward ends of which are pivotally connected to said bucket below the pivot connection of the bucket to the lifting arms, and means pivotally connecting the lower ends of said levers to the rearward ends of said second pair of links.

4. A loading device for mounting on vehicles comprising a support; a pair of laterally spaced lifting arms pivotally connected to said support; a bucket pivotally connected directly to and depending from the free ends of said lifting arms; power operated means for pivotally raising said lifting arms relative to said support; and linkage, for automatically swinging said bucket forwardly relative to said lifting arms during the initial raising of said lifting arms, comprising a first pair of laterally spaced links pivoted at their rearward ends about a fixed axis on said support adjacent the axis about which said lifting arms are pivoted, a pair of levers each of which is pivoted intermediate its ends upon one of said lifting arms, means pivotally connecting the forward ends of said links to the respective upper ends of said levers, a second pair of laterally spaced links, the forward ends of which are pivotally connected to said bucket, and means pivotally connecting the lower ends of said levers to the rearward ends of said second pair of links, said second pair of laterally spaced links constituting power operated means for tipping said bucket to discharge the load.

5. A loading device for mounting on vehicles comprising a support; a pair of laterally spaced lifting arms pivotally mounted on a common cross-shaft carried by said support; a bucket pivotally connected directly to and depending from the free ends of said lifting arms; hydraulic jacks for pivotally raising said lifting arms relative to said support; and linkage, for automatically swinging said bucket forwardly relative to said lifting arms during the initial raising of said lifting arms, comprising a first pair of laterally spaced links pivoted at their rearward ends about a fixed axis on said support adjacent said cross-shaft, a pair of levers each of which is pivoted intermediate its ends upon one of said lifting arms, the forward ends of said links being pivotally connected to the respective upper ends of said levers, a second pair of laterally spaced links, the forward ends of which are pivotally connected to said bucket, and means pivotally connecting the lower ends of said levers to the rearward ends of said second pair of links, said second pair of laterally spaced links constituting hydraulic jacks for tipping said bucket to discharge the load.

6. A loading device for mounting on vehicles comprising a support, a pair of forwardly extending lifting arms pivoted on said support, a bucket directly pivoted between and depending from the forward ends of said arms, power means for swinging said arms about their pivot for raising the bucket, and control mechanism effective during at least part of said raising movement of the lifting arms to tilt the bucket forwardly with respect to said arms, said mechanism comprising a pair of levers each pivoted intermediate its ends to one of said lifting arms, a first pair of links each pivotally connected at opposite ends to said bucket and said levers, and a second pair of links each pivotally connected at opposite ends to said support and said levers, the pivot axis of said second links to the support being located rearwardly and downwardly with respect to the pivot axis of said lifting arms on said support, and the distance between the end pivots of each of said second links being greater than the distance between the pivot axis of each lifting arm on the support and the pivot axis of the associated lever on said arm.

References Cited in the file of this patent

UNITED STATES PATENTS

| | | |
|---|---|---|
| 2,482,612 | Drott et al. | Sept. 20, 1949 |
| 2,711,257 | Apel | June 21, 1955 |
| 2,817,448 | Pilch | Dec. 24, 1957 |
| 2,846,097 | Beyerstedt | Aug. 5, 1958 |